United States Patent
Liu et al.

(10) Patent No.: US 11,966,584 B2
(45) Date of Patent: Apr. 23, 2024

(54) METHOD, DEVICE, AND COMPUTER PROGRAM PRODUCT FOR MANAGING STORAGE DEVICE

(71) Applicant: EMC IP Holding Company LLC, Hopkinton, MA (US)

(72) Inventors: Bing Liu, Tianjin (CN); Zheng Li, Beijing (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 54 days.

(21) Appl. No.: 17/216,343

(22) Filed: Mar. 29, 2021

(65) Prior Publication Data

US 2022/0283710 A1    Sep. 8, 2022

(30) Foreign Application Priority Data

Mar. 5, 2021    (CN) .......................... 202110244300.4

(51) Int. Cl.
*G06F 12/00*    (2006.01)
*G06F 3/06*    (2006.01)

(52) U.S. Cl.
CPC .......... *G06F 3/0611* (2013.01); *G06F 3/0619* (2013.01); *G06F 3/0647* (2013.01); *G06F 3/0653* (2013.01); *G06F 3/0676* (2013.01)

(58) Field of Classification Search
CPC .... G06F 3/0611; G06F 3/0619; G06F 3/0647; G06F 3/0653; G06F 3/0676
See application file for complete search history.

(56) References Cited

U.S. PATENT DOCUMENTS

| | | | | |
|---|---|---|---|---|
| 4,580,211 A * | 4/1986 | Doki | ..................... | G06F 3/0601 711/171 |
| 5,550,998 A * | 8/1996 | Willis | .................. | G11B 5/5547 360/78.04 |
| 6,574,676 B1 * | 6/2003 | Megiddo | ............... | G06F 3/0601 711/158 |
| 7,289,291 B1 * | 10/2007 | Schlumberger | ...... | G11B 5/5547 360/97.12 |
| 8,699,162 B1 * | 4/2014 | Grobis | .................. | G11B 20/18 360/75 |

(Continued)

*Primary Examiner* — David Yi
*Assistant Examiner* — Tahilba O Puche
(74) *Attorney, Agent, or Firm* — WOMBLE BOND DICKINSON (US) LLP

(57) ABSTRACT

Embodiments of the present disclosure relate to a method, an electronic device, and a computer program product for managing a storage device. The method includes: determining, based on the frequency of data access to the storage device, whether a data access component of the storage device will move; determining, if it is determined that the data access component will move, a first storage unit in the storage device based on a storage location of previously accessed data in the storage device, wherein the data access component is located at a first spatial location corresponding to the first storage unit; and sending a read request for data in a second storage unit in the storage device that is adjacent to the first storage unit, so as to cause the data access component to move from the first spatial location to a second spatial location corresponding to the second storage unit. The embodiments of the present disclosure can reduce the latency of data access to the storage device.

17 Claims, 6 Drawing Sheets

(56) References Cited

U.S. PATENT DOCUMENTS

| | | | | |
|---|---|---|---|---|
| 8,817,413 B1* | 8/2014 | Knigge | ............... | G11B 5/6005 |
| | | | | 360/75 |
| 8,941,943 B1* | 1/2015 | Coker | ................... | G11B 5/012 |
| | | | | 360/48 |
| 8,949,489 B1* | 2/2015 | Merchant | ........... | G06F 13/1626 |
| | | | | 710/39 |
| 9,852,754 B1* | 12/2017 | Martin | ................ | G11B 5/5547 |
| 2003/0086200 A1* | 5/2003 | Tokizono | ............ | G11B 5/5521 |
| | | | | 360/78.08 |
| 2006/0179163 A1* | 8/2006 | Muramatsu | ........... | G06F 3/0611 |
| | | | | 710/1 |
| 2008/0028142 A1* | 1/2008 | Kleinschmidt | ..... | G06F 11/3485 |
| | | | | 711/112 |
| 2008/0168452 A1* | 7/2008 | Molaro | .............. | G06F 11/1435 |
| | | | | 718/103 |
| 2009/0288103 A1* | 11/2009 | Levine | ................. | G06F 3/0611 |
| | | | | 719/320 |
| 2018/0095695 A1* | 4/2018 | Agombar | ................ | G06F 3/064 |
| 2018/0275870 A1* | 9/2018 | Goldberg | ............ | G06F 3/0644 |
| 2019/0051324 A1* | 2/2019 | Zhao | ................... | G06F 3/0616 |
| 2021/0382631 A1* | 12/2021 | Singh | ................. | G06F 11/1464 |
| 2021/0398559 A1* | 12/2021 | Kawabe | ............ | G11B 20/1217 |

* cited by examiner

METHOD, DEVICE, AND COMPUTER PROGRAM PRODUCT FOR MANAGING STORAGE DEVICE

CROSS-REFERENCE TO RELATED APPLICATION

This patent application claims priority, under 35 U.S.C. § 119, of Chinese Patent Application No. 202110244300.4, filed Mar. 5, 2021, which is incorporated by reference in its entirety.

TECHNICAL FIELD

Embodiments of the present disclosure generally relate to the field of data storage, and in particular, to a method, a device, and a computer program product for managing a storage device.

BACKGROUND

Different users usually perform data access to a storage device at different data access frequencies. During a time period in which the frequency of data access to the storage device is low, input/output (I/O) requests are made at a long time interval, and such time is often referred to as an idle time of the storage device. During the idle time of the storage device, a magnetic head of the storage device may move significantly. Such significant movement of the magnetic head sometimes causes an increase in latency of data access to the storage device, which in turn causes a degradation in performance of the storage device.

SUMMARY OF THE INVENTION

Embodiments of the present disclosure provide a method, a device, and a computer program product for managing a storage device.

In a first aspect of the present disclosure, a method for managing a storage device is provided. The method includes: determining, based on the frequency of data access to the storage device, whether a data access component of the storage device will move; determining, if it is determined that the data access component will move, a first storage unit in the storage device based on a storage location of previously accessed data in the storage device, wherein the data access component is located at a first spatial location corresponding to the first storage unit; and sending a read request for data in a second storage unit in the storage device that is adjacent to the first storage unit, so as to cause the data access component to move from the first spatial location to a second spatial location corresponding to the second storage unit.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions including: determining, based on the frequency of data access to a storage device, whether a data access component of the storage device will move; determining, if it is determined that the data access component will move, a first storage unit in the storage device based on a storage location of previously accessed data in the storage device, wherein the data access component is located at a first spatial location corresponding to the first storage unit; and sending a read request for data in a second storage unit in the storage device that is adjacent to the first storage unit, so as to cause the data access component to move from the first spatial location to a second spatial location corresponding to the second storage unit.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

In the accompanying drawings, the same or corresponding numerals represent the same or corresponding parts.

DETAILED DESCRIPTION

Figure 1:
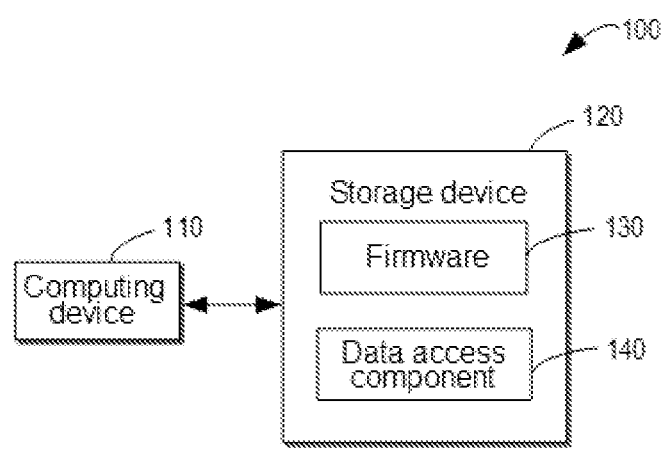
FIG. 1 illustrates a schematic diagram of an example system in which some embodiments of the present disclosure can be implemented.

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

A time period in which the frequency of data access to a storage device is low is often referred to as an idle time. Some storage devices typically experience movement of magnetic heads during the idle time. For example, for some storage devices, long-term immobilization of magnetic heads may cause lubricant oil to drip onto disks of the storage devices and thus cause damage to the storage devices. Therefore, a predetermined idle time value is usually pre-set in the firmware of a storage device. If no data access occurs on the storage device for a time period as long as the predetermined idle time value, the firmware will perform a operation to move the magnetic head.

For another example, for some storage devices, a predetermined idle time value is set in the firmware thereof. If no data access occurs on the storage device for a time period as long as the predetermined idle time value, the firmware will perform an operation to move the magnetic head to a certain predetermined location for logging, etc.

This operation of moving the magnetic head during the idle time of the storage device may cause problems of a degradation in performance of the storage device and reduced efficiency of data reading from a cache. For example, if a magnetic head moves during a data access, then for the next data access that follows, the magnetic head needs to move back to its original location for data access. Therefore, this causes repeated magnetic head movement. This repeated magnetic head movement increases the latency of I/O requests, which in turn affects the performance of the storage device. On the other hand, such magnetic head movement may occur while a read from the cache has not yet been completed. The cache needs to wait for the magnetic head to move back to its original location before it can continue the uncompleted reading. This will reduce the efficiency of data reading from the cache. Therefore, in order to improve the performance of the storage device and to increase the efficiency of data reading from the cache, the movement of magnetic head of the storage device needs to be managed.

In a conventional solution, the predetermined idle time value is changed by upgrading the firmware of the storage device, thus preventing undesired movement of the magnetic head. For example, the impact of magnetic head movement on the performance of the storage device can be addressed by setting the predetermined idle time value in the firmware of the storage device to a large value, for example, 1 second (s).

The above conventional solution has encountered some problems in actual use. For example, to prevent undesired magnetic head movement, some manufacturers set the predetermined idle time value in the firmware to 1 s. The data access frequencies of some users may have the characteristic of always accessing data at a long, e.g., 0.99 s, time interval. In this case, the magnetic head of the storage device will remain substantially immobile. Such long-term substantial immobilization of the magnetic head of the storage device may cause a problem of disk damage due to dripping of lubricant oil.

In practice, the situation of data access to storage devices is not the same for different users. Therefore, setting the same idle time value for different users' storage devices may cause many potential problems, for example, the problem of disk damage due to dripping of lubricant oil as described above. However, firmware of the same type of storage devices is set by the manufacturer of the storage devices and is identical and cannot be changed by a customer. Therefore, this method of modifying the predetermined idle time value by upgrading the firmware of a storage device cannot adapt to the needs of different users.

In addition, the release cycle of firmware upgrades for storage devices is long, and users have to wait for a long period of time to get the upgraded firmware for storage devices to solve the magnetic head movement problem. Furthermore, since firmware of different types of storage devices is different, the firmware of all types of storage devices needs to be upgraded to solve the above problem.

Embodiments of the present disclosure propose a solution for managing a storage device to solve one or more of the above problems and other potential problems. In this solution, based on the frequency of data access to the storage device, it is determined whether a data access component (e.g., the magnetic head) of the storage device will move. If it is determined that the data access component will move, a first spatial location where the data access component is located is determined based on a storage location of previously accessed data in the storage device. The solution further includes: sending a data read request corresponding to a second spatial location adjacent to the first spatial location, so as to cause the data access component to move from the first spatial location to the second spatial location.

The embodiments of the present disclosure can adapt to different users. By determining data access frequencies of different users so as to determine whether the magnetic head will move, it is possible to avoid undesired magnetic head movement. In this way, it is also possible to reduce the latency of data access to the storage device and to improve the efficiency of data reading from the cache.

The embodiments of the present disclosure will be described in detail below with reference to the accompanying drawings.

FIG. 1 illustrates a schematic diagram of example storage system 100 in which some embodiments of the present disclosure can be implemented. Storage system 100 includes computing device 110 and storage device 120 for storing data. Storage device 120 includes firmware 130 and data access component 140. Computing device 110 can access data stored in storage device 120. For example, computing device 110 can access the data in storage device 120 through data access component 140.

In some embodiments, when computing device 110 issues an access request (e.g., a read request or a write request) for data in storage device 120, data access component 140 will move to the spatial location where that data is located and access that data. Computing device 110 can access the data accessed by data access component 140 through various data transmission protocols or methods. Computing device 110 can send access requests (e.g., read requests or write requests) for the data in storage device 120 in a sequential manner or in a random manner. In some embodiments, storage device 120 may be a disk, and the data access component may be the magnetic head of the disk. In some embodiments, storage device 120 may be a magnetic tape, and data access component 140 may be the magnetic head of the magnetic tape.

Storage device 120 further includes firmware 130, wherein firmware 130 is firmware 130 that is published by the manufacturer of storage device 120 and pre-installed in storage device 120. Firmware 130 is provided with a predetermined idle time value, a predetermined operation for data access component 140, etc. If it is determined that data access component 140 of storage device 120 has not performed any data access operation for a period of time as long as the predetermined idle time value, the predetermined operation for data access component 140 in firmware 130 is triggered. For example, the predetermined operation may be to cause data access component 140 to move a certain great distance, or to move to a certain distant predetermined spatial location. It should be understood that firmware 130 may further include other parameters related to storage device 120 or other predetermined operations.

It should be understood that example storage system 100 in FIG. 1 is only illustrative and not limiting. According to embodiments of the present disclosure, storage system 100 can be implemented in any suitable manner. For example, storage system 100 may include any suitable number of storage devices 120, and these storage devices 120 may be connected or arranged in any suitable manner. Examples of storage device 120 may include, but are not limited to, hard disk devices, hard disk drives (HDD), redundant arrays of independent disks (RAID), or other hard disk devices.

Figure 2:
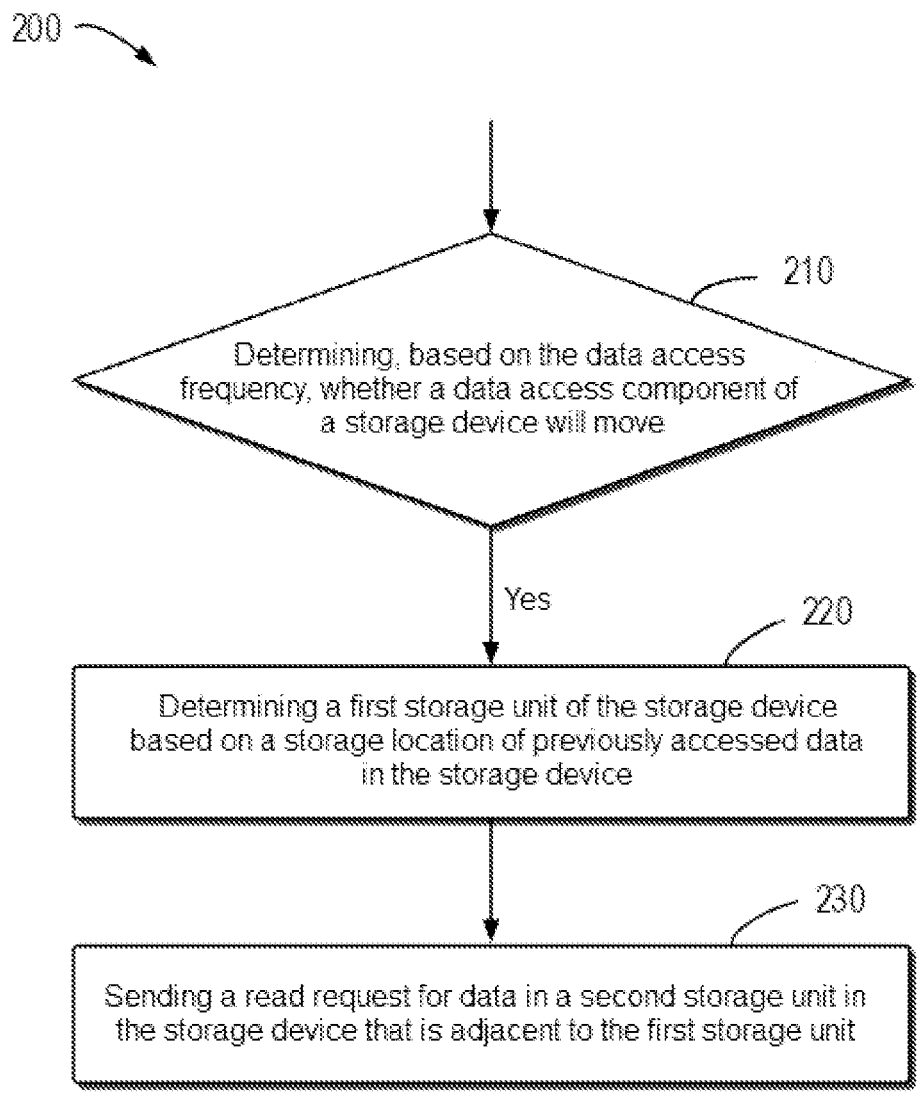
FIG. 2 illustrates a schematic diagram of an example method for managing a storage device according to some embodiments of the present disclosure.

FIG. 2 illustrates a flow chart of example method 200 for managing storage device 120 according to some embodiments of the present disclosure. Method 200 may be, for example, performed by computing device 110 of storage system 100 as shown in FIG. 1. It should be understood that method 200 may also be performed by other suitable devices or apparatuses. Method 200 may include additional actions not shown and/or may omit actions shown, and the scope of the present disclosure is not limited in this regard. Method 200 is described in detail below in connection with FIG. 1.

As shown in FIG. 2, at 210, based on the frequency of data access to storage device 120, it is determined whether data access component 140 of storage device 120 will move. If the frequency of data access to storage device 120 is low, it is determined that data access component 140 will move.

In some embodiments, the frequency of data access to storage device 120 can be determined based on historical records of data access to storage device 120. For example, multiple time intervals of I/O requests for storage device 120 for a predetermined length of time (e.g., 10 s) prior to the current time can be determined based on the historical records. If each of the multiple time intervals is greater than a time interval threshold, it is indicated that the frequency of data access to storage device 120 is low, and it is determined that data access component 140 will move. For example, the time interval threshold can be pre-set to 100 milliseconds (ms). It should be understood that this is merely schematic, and in some embodiments, the time interval threshold can be set to any arbitrary time length value.

In some embodiments, other approaches may also be used to determine the frequency of data access to storage device 120. For example, an average time interval of I/O requests for storage device 120 within a predetermined length of time prior to the current time can be determined based on the historical records. If the average time interval is greater than the predetermined time interval threshold, it is indicated that the frequency of data access to storage device 120 is low, and it is determined that data access component 140 will move.

Additional or alternatively, in some embodiments, other approaches may also be used to determine whether data access component 140 will move. In the following description with reference to FIGS. 3 to 4, the process of determining whether data access component 140 will move will be described in more detail.

If it is determined at 210 that data access component 140 will move, method 200 proceeds to 220. At 220, computing device 110 determines a first storage unit of storage device 120 based on a storage location of previously accessed data in storage device 120, wherein data access component 140 is located at a first spatial location corresponding to the first storage unit. For example, computing device 110 determines the first storage unit (e.g., the first sector) of storage device 120 based on the storage location in storage device 120 corresponding to a batch of I/O requests of previous access.

In some embodiments, computing device 110 can determine a first storage location of a storage address with a maximum offset in the storage location corresponding to the previously accessed data, and determine a storage unit in storage device 120 that includes the first storage location as the first storage unit. For example, computing device 110 can determine a first storage location of a storage address with an offset in the storage location of storage device 120 corresponding to a batch of I/O requests of previous access, and determine a storage unit (e.g., a sector) in storage device 120 that includes the first storage location as the first storage unit.

At 230, computing device 110 sends a read request for data in a second storage unit in storage device 120 that is adjacent to the first storage unit, so as to cause data access component 140 to move from the first spatial location to a second spatial location corresponding to the second storage unit. For example, in some embodiments, the second storage unit adjacent to the first storage unit is the storage unit immediately after the first storage unit along a predetermined direction of movement of data access component 140. The predetermined direction of movement of data access component 140 (such as the magnetic head) may be, for example, a clockwise direction or counterclockwise direction. It should be understood that the predetermined direction of movement of data access component 140 may also be other appropriate directions.

When computing device 110 sends a read request for data in the second storage unit, data access component 140 of storage device 120 will move to a spatial location corresponding to the second storage unit to cause computing device 110 to read the data in the second storage unit via data access component 140.

It should be understood that the above description of sending a read request for data in the second storage unit is merely schematic and not limiting. In other embodiments, other approaches may be used to send this read request. In the following description with reference to FIGS. 3 and 5, the process of sending a read request for data in the second storage unit will be described in more detail.

In the above manner, a prediction can be made as to the movement of data access component 140 of storage device 120 during an idle time. If a movement of data access component 140 during the idle time is predicted, by sending a read request, data access component 140 is caused to make a very small movement (e.g., a movement to the spatial location corresponding to the second storage unit adjacent to the currently corresponding first storage unit).

In this way, it is possible to avoid undesired movements of data access component 140 in a large range. In addition, it is possible to reduce the data access latency and improve the performance of storage device 120 since large movements of data access component 140 are avoided. In this way, it is also possible to improve the efficiency of data reading from the cache. In addition, this approach can be applied to different types of storage devices 120 for different users. It is more flexible and adaptable than conventional solutions that use firmware upgrades.

Figure 3:
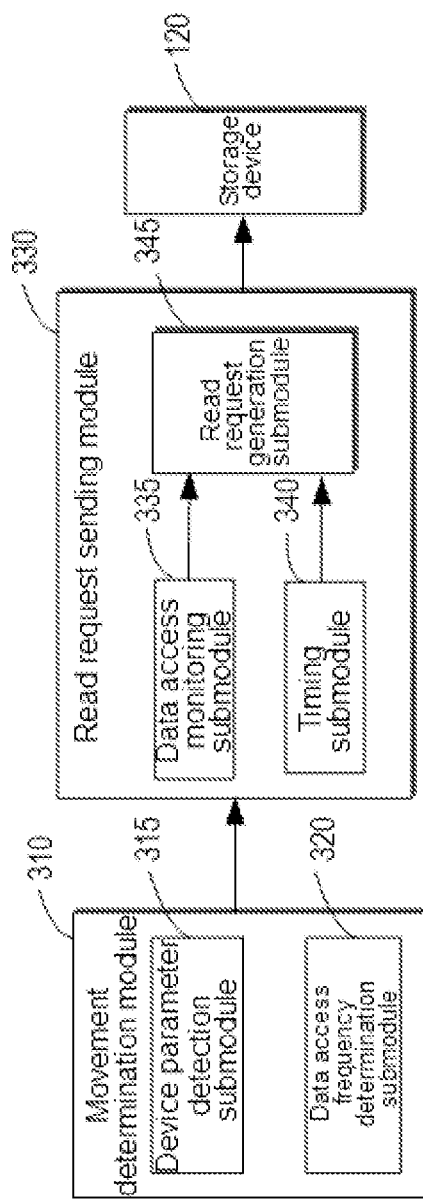
FIG. 3 illustrates a schematic block diagram of managing a storage device according to some embodiments of the present disclosure.

FIG. 3 illustrates a more detailed schematic block diagram of managing storage device 120 according to some embodiments of the present disclosure. Movement determination module 310, read request sending module 330, etc. in FIG. 3 may be implemented in computing device 110 shown in FIG. 1. It should be understood that movement determination module 310, read request sending module 330, etc. may also be implemented by other appropriate devices or apparatuses.

As shown in FIG. 3, movement determination module 310 can be used to determine whether data access component 140 will move. In some embodiments, movement determination module 310 includes device parameter detection submodule 315 and data access frequency determination submodule 320. Device parameter detection submodule 315 can acquire system parameters related to storage device 120 that are stored in firmware 130 of storage device 120, such as the model and the manufacturer of storage device 120. It should be understood that in some embodiments, the system parameters may also include some other parameters related to storage device 120. For example, device parameter detection submodule 315 can determine, based on the model parameter of storage device 120, that storage device 120 is storage device 120 that has a problem of degraded storage device performance due to movement of data access component 140.

Data access frequency determination submodule 320 can determine the frequency of data access to storage device 120 based on historical records of data access. For example, data access frequency determination submodule 320 can determine, based on the historical records, multiple time intervals of I/O requests for storage device 120 for a predetermined length of time (e.g., 10 s) prior to the current time. If each of the multiple time intervals is greater than a time interval threshold (e.g., 100 ms), it indicates the frequency of data access to storage device 120 is low.

For another example, data access frequency determination submodule 320 can determine, based on the historical records, an average time interval of I/O requests for storage device 120 for a predetermined length of time (e.g., 10 s) prior to the current time. If the average time interval is greater than the predetermined time interval threshold (e.g., 100 ms), it is indicated that the frequency of data access to storage device 120 is low, and it is determined that data access component 140 will move.

It should be understood that the time length of 10 s and the time interval threshold of 100 ms described above are merely schematic and not limiting. In some embodiments, other time lengths can be selected, and/or other time interval thresholds can be selected.

It should be understood that device parameter detection submodule 315 and data access frequency determination submodule 320 as shown in FIG. 3 may be two modules executed in parallel or two modules executed serially. In the following description with reference to FIG. 4, the process of using the serially executed device parameter detection submodule 315 and data access frequency determination submodule 320 to determine whether data access component 140 will move will be described in further detail.

In the above manner, a prediction can be made as to whether an undesired movement of data access component 140 will occur. In this manner, it is possible to avoid latency of data access due to movement of data access component 140, thereby improving the performance of storage device 120. In addition, by this way, the efficiency of data reading from the cache can be improved.

Returning to FIG. 3, FIG. 3 also illustrates read request sending module 330, which may include data access monitoring submodule 335, timing submodule 340, and read request generation submodule 345. In some embodiments, based on the historical records of storage device 120, data access monitoring submodule 335 can determine a storage location of previously accessed data in storage device 120, thereby determining the first storage unit in storage device 120.

In some embodiments, data access monitoring submodule 335 can determine the first storage unit based on the location, in storage device 120, of a batch of I/O requests of the access previous to the current time in the historical records. For example, each I/O request in the batch of I/O requests of the previous access has a corresponding offset value and a corresponding data size value. The sums of the offset values and the data size values of all I/O requests in the batch of I/O requests of the previous access are sorted, and the maximum value of the sums of the offset values and the data size values is determined as the first storage location. A storage unit in storage device 120 that includes the first storage location is determined as the first storage unit. Data access monitoring submodule 335 can send information about the first storage unit to read request generation submodule 345 for subsequent use.

FIG. 3 also illustrates timing submodule 340, which is used to determine a first time interval for the time to send a read request. Timing submodule 340 sends the first time interval to read request generation submodule 345 to cause read request generation submodule 345 to generate and send a read request at a time that has a first time interval from the previous data access. In some embodiments, timing submodule 340 sets the first time interval to a predetermined idle time value (e.g., 400 ms) stored in firmware 130 of storage device 120 by acquiring that idle time value.

It should be understood that the process described above for determining the first time interval is only illustrative and not limiting, and in other embodiments, other approaches may also be used to set the first time interval. In some embodiments, timing submodule 340 can also determine the first time interval by means of method 500 described in more detail below with reference to FIG. 5.

Read request generation submodule 345 receives information about the first storage unit sent by data access monitoring submodule 335 and the first time interval sent by timing submodule 340. Based on the information about the first storage unit, read request generation submodule 345 can determine a second storage unit adjacent to the first storage unit. The second storage unit can be the one immediately after the first storage unit along the predetermined direction of movement of data access component 140.

In some embodiments, read request generation submodule 345 generates a read request (e.g., a read request having a size of 4 k) for the data in the second storage unit and sends that read request to storage device 120 at a time that has a first time interval from the previous data access. It should be understood that the size of 4 k of the read request is merely schematic and not limiting, and it is possible to set the read request to other sizes.

In this way, it is possible to determine when to send a read request to storage device 120 for which storage unit. Storage device 120 receives this read request and moves the data access component to a spatial location adjacent to the current spatial location, thereby avoiding a large movement of data access component 140. In this way, the latency of data access to storage device 120 can be reduced and the performance of storage device 120 can be improved.

Figure 4:
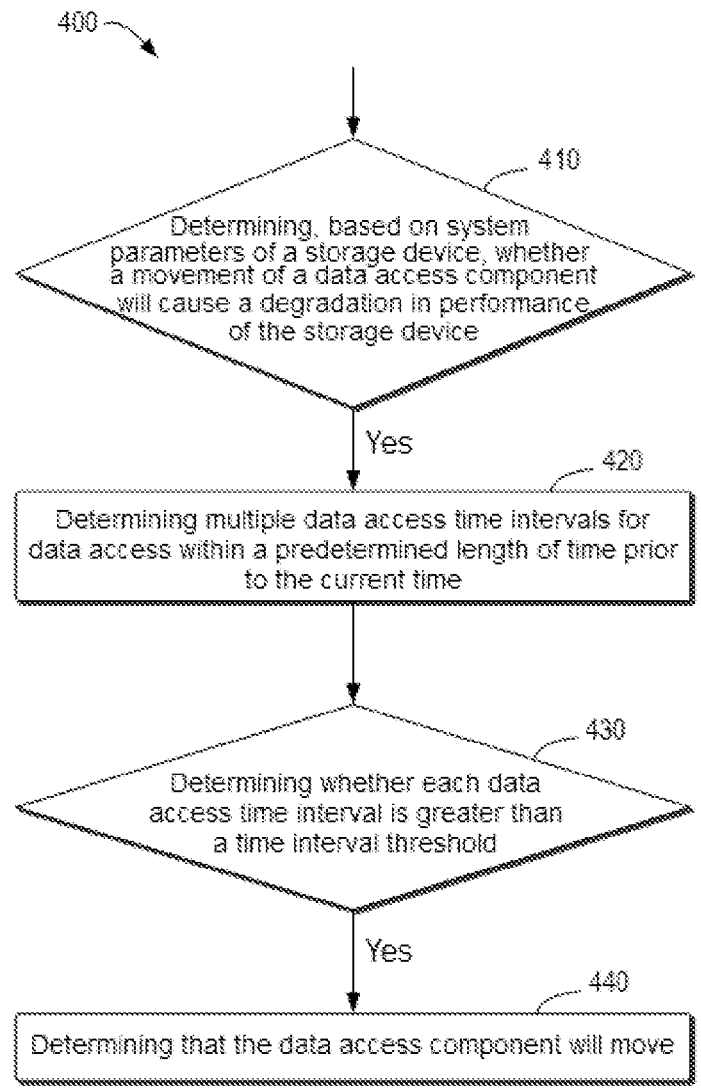
FIG. 4 illustrates a schematic diagram of an example method for determining whether a data access component of a storage device will move according to some embodiments of the present disclosure.

In some embodiments, method 400 as shown in FIG. 4 can be used to determine whether data access component 140 of the storage device will move. Several embodiments of determining whether data access component 140 of the storage device will move are described in more detail below in connection with FIG. 4.

FIG. 4 illustrates a schematic diagram of example method 400 for determining whether data access component 140 of a storage device will move according to some embodiments of the present disclosure. Method 400 may be regarded as an example implementation of block 210 in method 200. Method 400 may be, for example, performed by computing device 110 of storage system 100 as shown in FIG. 1. For example, method 400 can be performed by movement determination module 310 (including device parameter detection submodule 315 and data access frequency determination submodule 320) implemented at computing device 110 as shown in FIG. 3. It should be understood that method 400 may also be performed by other suitable devices or apparatuses. Method 400 may include additional actions not shown and/or may omit actions shown, and the scope of the present disclosure is not limited in this regard. Method 400 is described in detail below in combination with FIGS. 1 and 3.

As shown in FIG. 4, at 410, device parameter detection submodule 315 can determine, based on system parameters of storage device 120 (e.g., the model, manufacturer, etc. of storage device 120), whether movement of data access component 140 will cause a degradation in performance of storage device 120. In some embodiments, device parameter detection submodule 315 can determine, based on the model parameter of storage device 120, whether storage device 120 is storage device 120 that has a problem of degraded storage device performance due to movement of data access component 140. If device parameter detection submodule 315 determines that storage device 120 is storage device 120 that has a problem of degraded storage device performance due to movement of data access component 140, it is determined that movement of data access component 140 will cause a degradation in performance of storage device 120.

If it is determined at 410 that movement of data access component 140 will cause a degradation in performance of storage device 120, method 400 proceeds to 420. At 420, data access frequency determination submodule 320 determines multiple data access time intervals for data access to storage device 120 within a predetermined length of time prior to the current time. For example, data access frequency determination submodule 320 can determine, based on the historical records, multiple data access time intervals of I/O requests for storage device 120 within a predetermined length of time (e.g., 10 s) prior to the current time.

At 430, data access frequency determination submodule 320 determines whether each of the multiple data access time intervals is greater than a time interval threshold (e.g., 100 ms). Alternatively, in some embodiments, data access frequency determination submodule 320 can determine whether an average data access time interval of the multiple data access time intervals is greater than a time interval threshold (e.g., 100 ms).

If it is determined at 430 that each of the multiple data access time intervals is greater than the time interval threshold, method 400 proceeds to 440. At 440, it is determined that data access component 140 will move. Next, the following process can be performed by computing device 110 or by read request sending module 330 implemented at computing device 110 as shown in FIG. 3. For example, the process described in combination with 220 in FIG. 2 may be performed by computing device 110.

In this manner, it is possible to first determine by device parameter detection submodule 315 whether movement of data access component 140 will cause a degradation in performance of the storage device. If it is determined that the movement of data access component 140 will not cause a degradation in performance of said storage device, data access frequency determination submodule 320 does not need to perform the following process. In this way, computing resources of computing device 110 can be saved and unnecessary processing can be avoided.

Furthermore, in this way, it is possible to determine a data access frequency respectively for different types of storage devices 120 of different users. As a result, it is possible to adapt to different storage devices 120 of different users and having different data access modes, thereby reducing the latency of data access to different storage devices 120 of different users. In addition, this approach avoids the need to upgrade firmware 130 of storage device 120, thereby reducing the workload of the developer of storage device 120. This approach can be applied to different types of storage devices 120 for different users. It is more flexible and adaptable than conventional solutions that use firmware upgrades.

Figure 5:
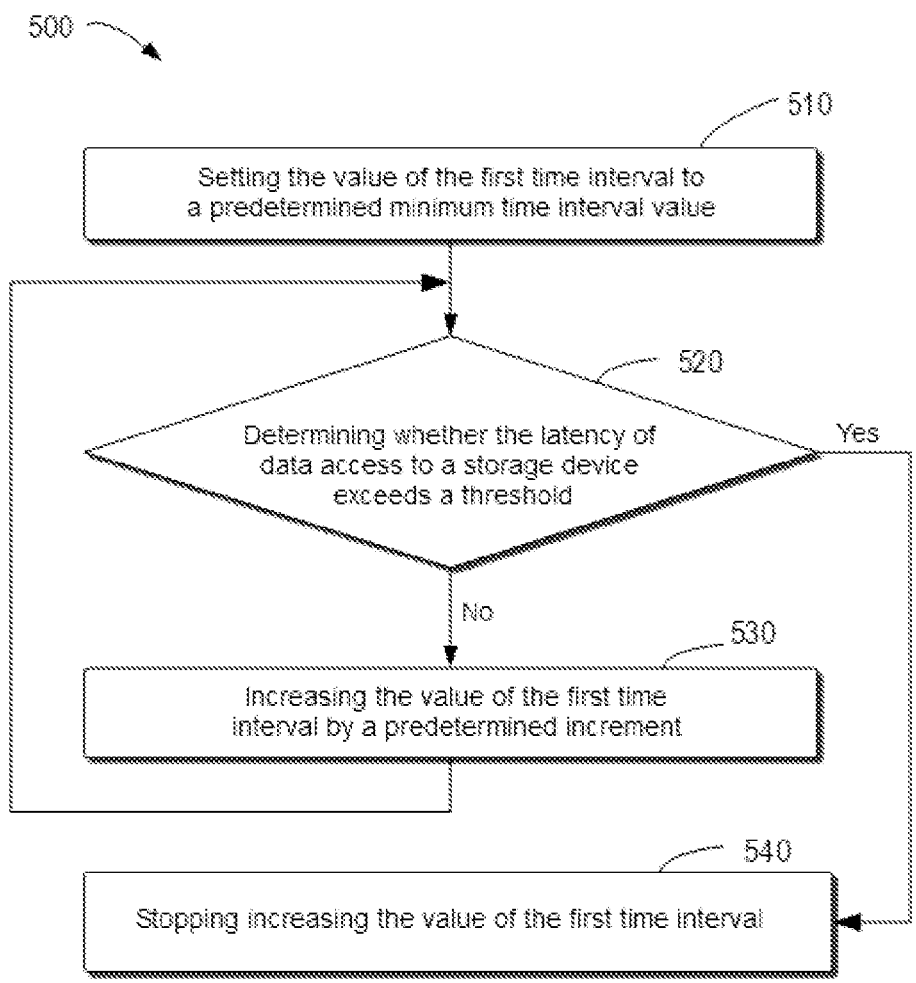
FIG. 5 illustrates a schematic diagram of an example method for determining a time to send a read request according to some embodiments of the present disclosure.

In some embodiments, timing submodule 340 can also set the first time interval by means of method 500 described in more detail with reference to FIG. 5. FIG. 5 illustrates a schematic diagram of example method 500 for determining a first time interval according to some embodiments of the present disclosure. Method 500 may be, for example, performed by computing device 110 of storage system 100 as shown in FIG. 1. For example, method 500 can also be performed by timing submodule 340 in read request sending module 330 implemented at computing device 110 as shown in FIG. 3. It should be understood that method 500 may also be performed by other suitable devices or apparatuses. Method 500 may include additional actions not shown and/or may omit actions shown, and the scope of the present disclosure is not limited in this regard. Method 500 is described in detail below in combination with FIGS. 1 and 3.

At 510, timing submodule 340 sets the value of the first time interval to a predetermined minimum time interval value. For example, the value of the first time interval can be set to a predetermined 60 ms. It should be understood that this is merely schematic and not limiting, and that the predetermined minimum time interval value may also be other appropriate time lengths.

At 520, timing submodule 340 determines whether the latency of data access to storage device 120 exceeds a threshold (e.g., 20 ms). In some embodiments, the threshold may also be set to other appropriate time lengths.

If, at 520, timing submodule 340 determines that the latency of data access to storage device 120 does not exceed the threshold, method 500 proceeds to 530. At 530, the value of the first time interval is increased by a predetermined increment (e.g., 10 ms). It should be understood that increments of other sizes may also be used to increase the value of the first time interval. After increasing the value of the first time interval, method 500 returns to 520 to continue.

If, at 520, timing submodule 340 determines that the latency of data access to storage device 120 exceeds the threshold, method 500 proceeds to 540. At 540, timing submodule 340 stops increasing the value of the first time interval, i.e., the current value of the first time interval is provided to the subsequent process as the preferred value.

In the above manner, the first time interval can be determined dynamically. This avoids a number of very small movements of data access component 140 caused by setting of the first time interval to a very small value. In addition, by incrementing the value of the first time interval and monitoring whether the data access latency exceeds a threshold, the first time interval can be set to a value as large as possible. In this way, undesired large movements of data access component 140 can be avoided in a better manner, thereby reducing the latency of data access.

Several experimental verifications were conducted using a particular model of storage device for the solution described herein with reference to FIGS. 1 to 5. Table 1 below shows the comparison of data access latency without using this solution and data access latency with this solution for data access for random read requests. From the comparison results in Table 1, it can be seen that the data access latency with this solution is significantly reduced for different sizes of random read requests.

TABLE 1

Examples of latency comparison for random read requests

| Size of read request | Latency (ms) without using this solution | Latency (ms) with this solution (first time interval being 90 ms) | Latency (ms) with this solution (first time interval being 60 ms) |
|---|---|---|---|
| 4k | 20.0 | 9.1 | 9.2 |
| 64K | 20.4 | 9.3 | 9.6 |
| 128K | 20.6 | 9.6 | 10.0 |
| 384K | 21.6 | 11.0 | 10.9 |

Tables 2 and 3 below show the comparison between data access latency without using this solution and data access latency with this solution for data accesses for sequential read requests and sequential write requests, respectively. From the comparison results in Tables 2 and 3, it can be seen that the data access latency with this solution is significantly reduced for different sizes of sequential read requests and sequential write requests.

TABLE 2

Examples of latency comparison for sequential read requests

| Size of read request | Latency (ms) without using this solution | Latency (ms) with this solution (first time interval being 90 ms) | Latency (ms) with this solution (first time interval being 60 ms) |
|---|---|---|---|
| 4k | 3.8 | 0.15 | 0.14 |
| 64K | 5.6 | 0.48 | 0.49 |
| 128K | 6.1 | 0.9 | 1.0 |
| 384K | 11.9 | 1.5 | 1.5 |

TABLE 3

Examples of latency comparison for sequential write requests

| Size of read request | Latency (ms) without using this solution | Latency (ms) with this solution (first time interval being 90 ms) | Latency (ms) with this solution (first time interval being 60 ms) |
|---|---|---|---|
| 4k | 3.2 | 0.59 | 0.52 |
| 64K | 3.5 | 0.78 | 0.86 |
| 128K | 14.9 | 5.0 | 4.8 |
| 384K | 3.2 | 0.59 | 0.52 |

From Tables 1 to 3 above, it can be seen that the solution described in the present disclosure is well able to reduce the latency of data access to storage device 120 and improve the performance of storage device 120. In particular, this reduction in data access latency is more significant for sequential data accesses. Therefore, the solution of the present disclosure can significantly improve the performance of storage device 120 during time periods in which the data access frequency is low.

Figure 6:
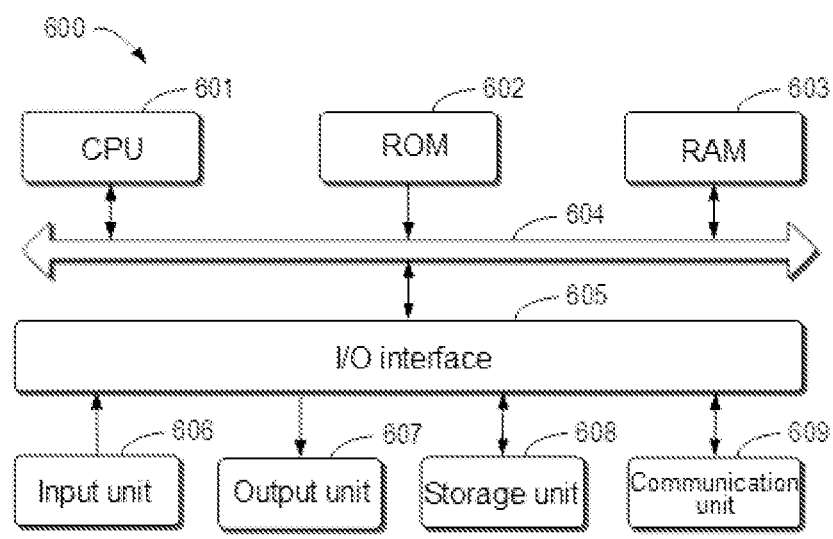
FIG. 6 illustrates a schematic block diagram of an example device that can be used to implement embodiments of the present disclosure.

FIG. 6 illustrates a schematic block diagram of example device 600 that can be used to implement the embodiments of the content of the present disclosure. For example, storage system 100 as shown in FIG. 1 may be implemented by device 600. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, method 200, 400, and/or 500, may be performed by processing unit 601. For example, in some embodiments, method 200, 400, and/or 500 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200, 400, and/or 500 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including an object oriented programming language such as Smalltalk, C++, and the like and conventional procedural programming languages such as the C language or similar programming languages The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage device, comprising:
determining whether a data access component of the storage device will move by comparing a time interval threshold with a plurality of data access time intervals between a plurality of data accesses to the storage device within a predetermined length of time prior to a current time, wherein the determining is based on whether each of the plurality of data access time intervals is greater than the time interval threshold;
in response to determining that the data access component will move, determining a first storage unit in the storage device based on a storage location of previously accessed data in the storage device, the first storage unit corresponding to a first spatial location at which the data access component is currently located; and sending a read request for data in a second storage unit in the storage device that is adjacent to the first storage unit to cause the data access component to move from the first spatial location to a second spatial location corresponding to the second storage unit.

2. The method according to claim 1, wherein determining the first storage unit of the storage device includes:

determining a first storage location of a storage address with a maximum offset in the storage location of the previously accessed data; and determining that the first storage location is included in the first storage unit.

3. The method according to claim 1, wherein sending the read request includes:

sending the read request at a time that has a first time interval from previous data access.

4. The method according to claim 3, further comprising:

incrementing a value of the first time interval; and stopping incrementing the value of the first time interval in response to determining that latency of data access to the storage device exceeds a latency threshold.

5. The method according to claim 1, wherein determining the data access time intervals includes:

determining, based on system parameters of the storage device, whether the movement of the data access component will cause a degradation in performance of the storage device; and determining the plurality of data access time intervals if it is determined that the movement of the data access component will cause a degradation in performance of the storage device.

6. The method according to claim 1, wherein the storage device is a disk and the data access component is a magnetic head of the disk.

7. An electronic device, comprising:

at least one processor; and at least one memory storing computer program instructions, wherein the at least one memory and the computer program instructions are configured to cause, together with the at least one processor, the electronic device to perform actions of managing a storage device, the actions including:

determining whether a data access component of the storage device will move by comparing a time interval threshold with a plurality of data access time intervals between a plurality of data accesses to the storage device within a predetermined length of time prior to a current time, wherein the determining is based on whether each of the plurality of data access time intervals is greater than the time interval threshold;

in response to determining that the data access component will move, determining a first storage unit in the storage device based on a storage location of previously accessed data in the storage device, the first storage unit corresponding to a first spatial location at which the data access component is currently located; and sending a read request for data in a second storage unit in the storage device that is adjacent to the first storage unit to cause the data access component to move from the first spatial location to a second spatial location corresponding to the second storage unit.

8. The electronic device according to claim 7, wherein determining the first storage unit of the storage device includes:

determining a first storage location of a storage address with a maximum offset in the storage location of the previously accessed data; and determining that the first storage location is included in the first storage unit.

9. The electronic device according to claim 7, wherein sending the read request includes:

sending the read request at a time that has a first time interval from previous data access.

10. The electronic device according to claim 9, wherein the actions further include:

incrementing a value of the first time interval; and stopping incrementing the value of the first time interval in response to determining that latency of data access to the storage device exceeds a latency threshold.

11. The electronic device according to claim 7, wherein determining the data access time intervals includes:

determining, based on system parameters of the storage device, whether the movement of the data access component will cause a degradation in performance of the storage device; and determining the plurality of data access time intervals if it is determined that the movement of the data access component will cause a degradation in performance of the storage device.

12. The electronic device according to claim 7, wherein the storage device is a disk and the data access component is a magnetic head of the disk.

13. A computer program product tangibly stored on a non-volatile computer-readable medium and including machine-executable instructions, which when executed by a device, cause the device to perform actions of managing a storage device, the actions comprising:

determining whether a data access component of the storage device will move by comparing a time interval threshold with a plurality of data access time intervals between a plurality of data accesses to the storage device within a predetermined length of time prior to a current time, wherein the determining is based on whether each of the plurality of data access time intervals is greater than the time interval threshold;

in response to determining that the data access component will move, determining a first storage unit in the storage device based on a storage location of previously accessed data in the storage device, the first storage unit corresponding to a first spatial location at which the data access component is currently located; and sending a read request for data in a second storage unit in the storage device that is adjacent to the first storage unit to cause the data access component to move from the first spatial location to a second spatial location corresponding to the second storage unit.

14. The computer program product according to claim 13, wherein determining the first storage unit of the storage device includes:

determining a first storage location of a storage address with a maximum offset in the storage location of the previously accessed data; and determining that the first storage location is included in the first storage unit.

15. The computer program product according to claim 13, wherein sending the read request includes:

sending the read request at a time that has a first time interval from previous data access.

16. The computer program product according to claim 15, wherein the actions further include:
    incrementing a value of the first time interval; and
    stopping incrementing the value of the first time interval in response to determining that latency of data access to the storage device exceeds a latency threshold.

17. The computer program product according to claim 13, wherein determining the data access time intervals includes:
    determining, based on system parameters of the storage device, whether the movement of the data access component will cause a degradation in performance of the storage device; and
    determining the plurality of data access time intervals if it is determined that the movement of the data access component will cause a degradation in performance of the storage device.

\* \* \* \* \*